United States Patent [19]
Evans

[11] Patent Number: 5,307,971
[45] Date of Patent: May 3, 1994

[54] TAPE KEEPER FOR TAPE TRANSPORT ELEMENTS

[75] Inventor: Robert J. Evans, San Marino, Calif.

[73] Assignee: Datatape Incorporated, Pasadena, Calif.

[21] Appl. No.: 978,593

[22] Filed: Nov. 19, 1992

[51] Int. Cl.⁵ .............................................. B65H 27/00
[52] U.S. Cl. .................................. 226/168; 242/76; 226/196; 226/198
[58] Field of Search .............. 226/196, 168, 171, 190, 226/198, 200; 242/55, 76, 152

[56] References Cited

U.S. PATENT DOCUMENTS

| | | | |
|---|---|---|---|
| 2,567,049 | 9/1951 | Belluche | 242/75.2 X |
| 3,289,906 | 12/1966 | Shuller | 226/168 |
| 3,559,861 | 2/1971 | Knox | 226/168 |
| 3,636,408 | 1/1972 | Shuman | 242/55 X |
| 3,690,528 | 9/1972 | O'Connor | 242/55 X |
| 3,972,262 | 8/1976 | Albert, Jr. | 226/168 X |
| 4,756,790 | 7/1988 | Kinnunen | 242/58.5 X |
| 5,014,929 | 5/1991 | Kato et al. | 242/195 |

*Primary Examiner*—Daniel P. Stodola
*Assistant Examiner*—Paul Bowen
*Attorney, Agent, or Firm*—William F. Noval

[57] ABSTRACT

A tape keeper for use in magnetic tape recording and/or reproducing apparatus to keep tape on tape transport elements. The tape keeper has a plurality of flexible bristles supported on a support adjacent to a tape transport element. The element includes spaced tape edge guides between which the bristles extend to keep the tape on the element.

6 Claims, 3 Drawing Sheets

TAPE KEEPER FOR TAPE TRANSPORT ELEMENTS

FIELD OF THE INVENTION

This invention relates in general to magnetic tape recording and/or reproducing apparatus and, more particularly, to new and improved apparatus for keeping magnetic tape on magnetic tape transport elements, such as reels and guides, during storage or transport around a tape path.

BACKGROUND OF THE INVENTION

Magnetic tape recording and/or reproducing apparatus are widely used to record and reproduce analog and digital images and data on magnetic tape. Typically, the magnetic tape is wound in a pack on a supply reel. The supply reel can be contained in a single reel cartridge or in a two reel cassette which also has a takeup reel to which the tape is attached. The magnetic tape is transported around a tape path from the supply reel, past one or more stationary or rotating magnetic heads, to the takeup reel. The tape transport path has guide elements, such as posts or rollers, to guide the magnetic tape around the path. Typically, the magnetic tape contacting elements have edge guides, such as flanges, to laterally hold and guide the tape.

Tape keepers are used to keep tape in place on the supply and takeup reels and on the guide elements, as the tape is transported and when the tape goes slack. The tape keepers can be made of formed mylar. As shown in FIGS. 1 and 2, formed mylar tape keeper 10 nests between the flanges 12 and 14 of a reel 16 having magnetic tape 18 wound on core 20. In FIG. 2, the keeper 10 is shown deformed to allow removal or installation of reel 16 in the direction of arrow 22. The tape keeper can also be made from formed metal. As shown in FIGS. 3 and 4, formed metal keepers 24 keep tape 18 on guide roller 26 having core 28 and flanges 30 and 32. In FIG. 4, the tape 18 is deformed to load or unload it between the keepers 24.

The formed mylar and metal keepers described above have the following disadvantages.
1. Alignment of the keepers must be precise.
2. Improper loading of the tape can damage the tape and/or the keeper.
3. Manufacturing precision and cost as well as reliability are a concern.
4. A misaligned or damaged mylar tape keeper can scrape against tape or tape reel creating an audible sound which violates allowable acoustic signature.
5. Tape unloading is very difficult without damaging the tape.

U.S. Pat. No. 3,559,861, issued Feb. 2, 1971, inventor Knox, discloses a tape guide locating member 38 including a rigid protruding bar 42 having a vertical, double tapered end 44 which engages the flanges of spool-like guide 32. The disclosed tape guide has one or more of the above disadvantages, e.g., difficulty in loading or unloading tape without tape damage.

There is thus a problem in magnetic tape recording and reproducing apparatus to provide a tape keeper which is easily and economically manufactured, which is resistant to damage, which will not damage tape, which is light-weight and easy to use, and which will still perform its function if partially damaged.

SUMMARY OF THE INVENTION

According to the present invention, there is provided a new and improved tape keeper for use in magnetic tape recording and reproducing apparatus which solves the problems of known tape keepers. According to an aspect of the present invention, a tape keeper having flexible bristles is mounted adjacent to a tape reel or to a tape guide element to keep the tape on the reel or guide element. The bristles are laterally flexible to allow the tape to be easily loaded or unloaded without damage to the tape. The bristles are relatively rigid in a longitudinal direction to keep the tape on the reel or guide if the tape goes slack. The bristles can be of insulating material, such as plastic. The bristles can also be of electrically conductive material, such as metal, to control static buildup on tape.

DESCRIPTION OF THE PREFERRED EMBODIMENTS

Although the present invention will be described in relation to its use in a magnetic tape recording and reproducing apparatus, it will be understood that, in general, the present invention is useful in any application requiring the keeping of a web (such as film, optical tape, or the like) on a web contacting element such as a reel or guide.

Figure 1:
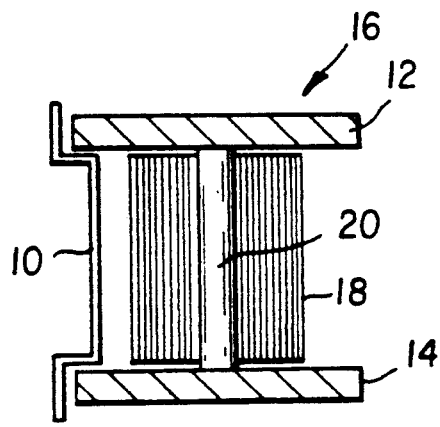
FIGS. 1–4 are elevational, sectional views of known types of tape keepers.
Figure 2:
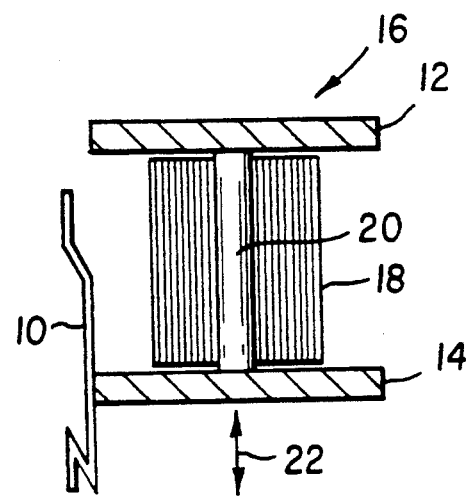
Figure 3:
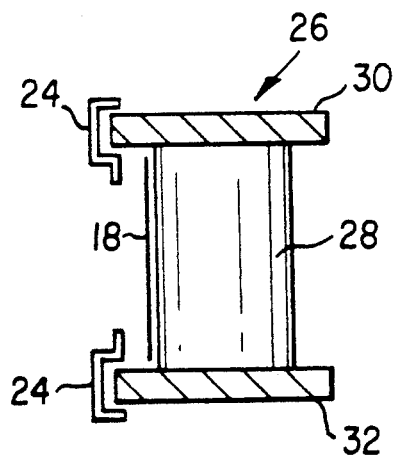
Figure 4:
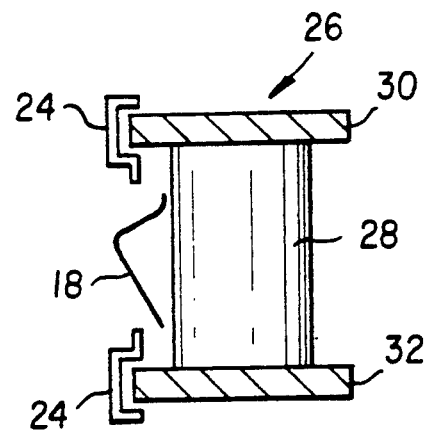
Figure 5:
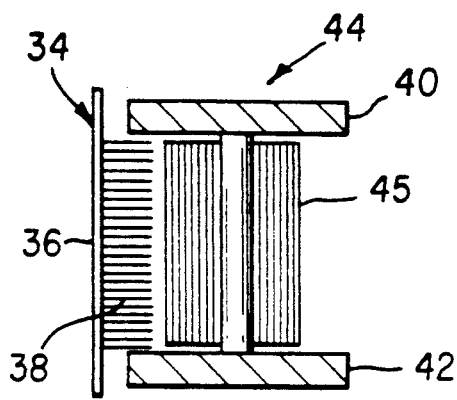
FIGS. 5–8 are elevational, sectional views of embodiments of tape keepers according to the present invention.

Referring now to FIGS. 5–8, there will be described an embodiment of the present invention. As shown in FIG. 5, tape keeper 34 includes a support 36 and a plurality of bristles 38 supported on the support 36. Bristles 38 are laterally flexible to allow easy loading and unloading of tape without damage to the tape or to the keeper. Bristles 38 are also relatively stiff in a longitudinal direction to keep the tape on the tape transport element. Bristles 38 may be of any suitable flexible material such as plastic, hair, rubber, or metal. In the latter case, electrically conductive metal bristles, which are grounded, can be used to control static buildup on tape.

Figure 6:
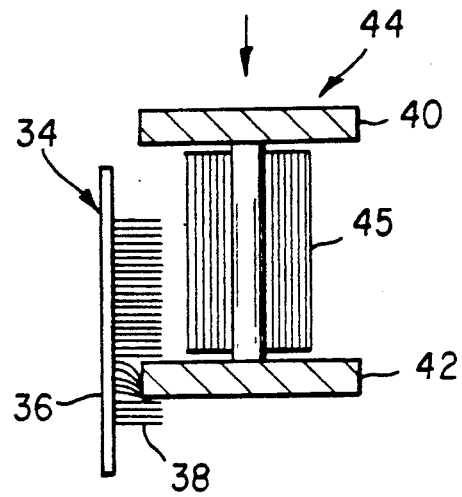

The tape keeper 34, according to the present invention, finds application in a magnetic tape recorder in which magnetic tape is transported between supply and takeup reels along a transport path past stationary or rotary magnetic heads. In FIG. 5, bristles 38 project between flanges 40 and 42 of magnetic tape reel 44 to keep magnetic tape 45 on reel 44. FIG. 6 shows how loading of reel 44 results in easy deformation of bristles 38 by reel 44.

Figure 7:
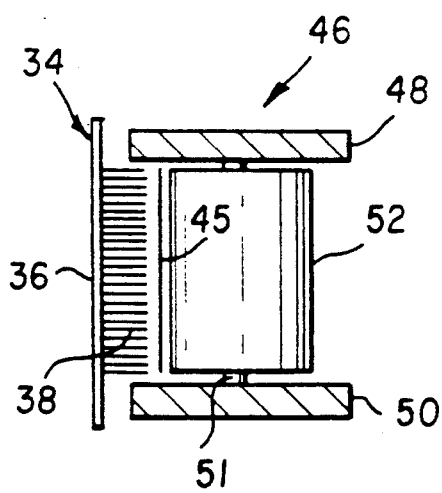
Figure 8:
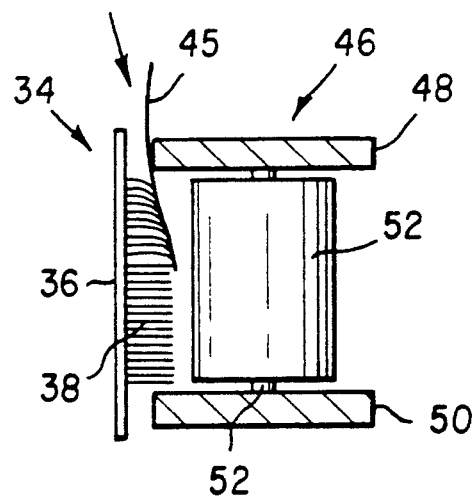

FIG. 7 shows tape keeper 34 with roller guide 46. Guide 46 has flanges 48, 50 and roller 52 on shaft 51 for guiding magnetic tape 45 along a tape transportation path. Bristles 38 of tape keeper 34 project between flanges 48, 50 to keep tape 45 on guide 46 when tape 45 goes slack. As shown in FIG. 8, magnetic tape 45 is shown being loaded onto guide 46 past tape keeper 34. Flexible bristles 38 are easily moved out of the way during loading without damage to either tape 45 or keeper 34. After loading, the bristles 38 spring back to their original shape without loss of their tape keeping effectiveness.

Figure 9:
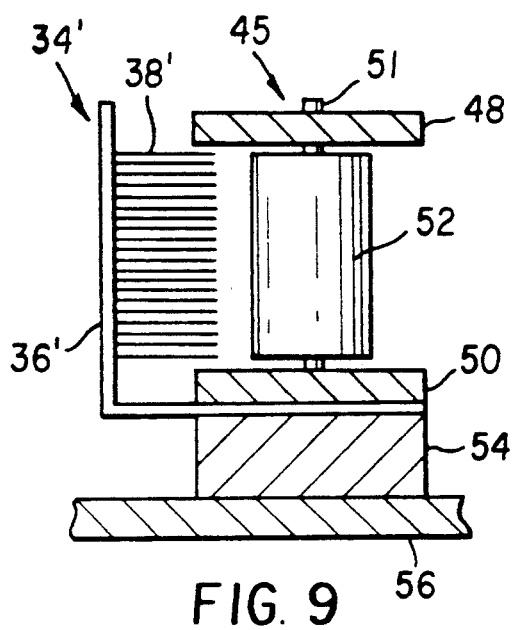
FIGS. 9 and 10 are respective side elevational and top plan views of a mounting for the tape keeper of the present invention.
Figure 11:
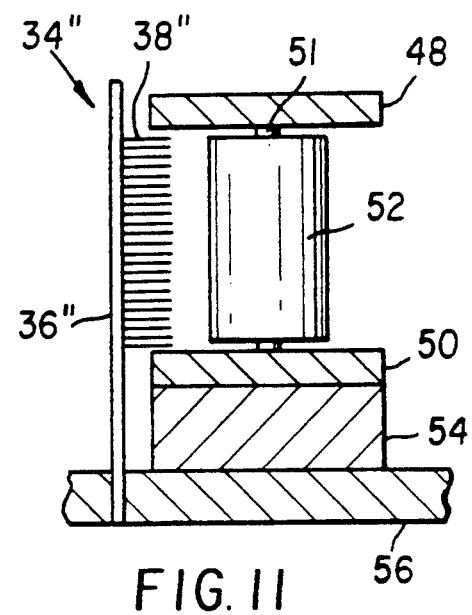
FIGS. 11 and 12 are respective side elevational and top plan views of another mounting for the tape keeper of the present invention.
Figure 10:
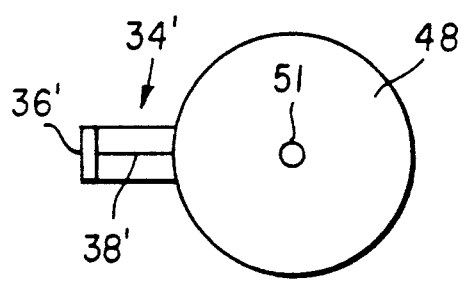
Figure 12:
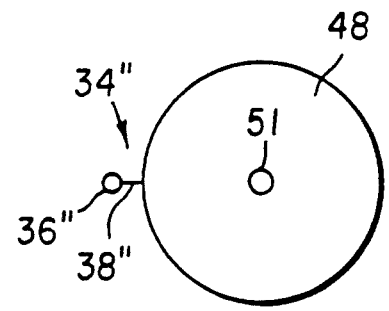

Referring now to FIGS. 9-12, there are shown two mountings for tape keeper 34 as used with roller guide 46. As shown in FIGS. 9 and 10, roller guide 46 is supported on a pedestal 54 mounted on a frame member 56 of a magnetic tape recorder (not shown). Tape keeper 34' includes bristles 38 mounted on "L" shaped support 36' which is mounted on pedestal 54 between flange 50 and pedestal 54. Bristles 38 of keeper 34 project between flanges 48 and 50. As shown in FIGS. 11 and 12, tape keeper 34" includes bristles 38 mounted on support 36" which is bonded into frame member 56.

Figure 13:
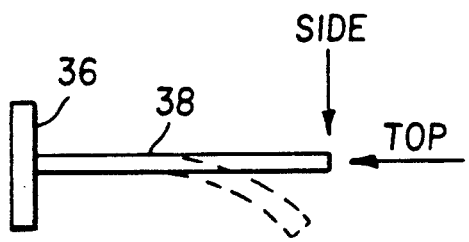
FIGS. 13 and 14 are diagrammatic views useful in explaining the present invention.
Figure 14:
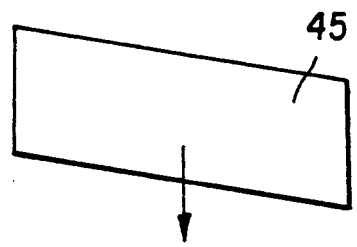

FIGS. 13 and 14 illustrate, (1) the flexibility of bristles 38 in the lateral direction to allow loading and unloading of tape 45 without damage to the tape 45 or to the bristles 38; and (2) the relative stiffness of bristles 38 in a direction longitudinally of the bristles 38, to resist bending when force is applied by tape 45. Since a major function of tape keeper 34 is to keep tape 45 on a reel or tape guide when the tape becomes relaxed, the force applied by the tape against the bristles is not appreciable enough to deform the bristles.

The tape keeper of the present invention has the following advantages.

1. It is totally passive.
2. It resists damage.
3. It will still function if partially damaged.
4. Ease of use.
5. Ease of manufacture.
6. Low cost.
7. Anti-static function.
8. Light weight.
9. Will not damage tape.

Although the invention has been described with reference to preferred embodiments thereof, it will be understood that variations and modifications can be effected within the scope and spirit of the invention as described above and as defined in the appended claims.

What is claimed is:

1. In a web transport system including a web transport element having a core supporting said web and spaced edge guides for contacting the web edges, the improvement comprising:
    a web keeper including a plurality of bristles mounted on a fixed support opposite said core, wherein only said web keeper bristles permanently extend between said spaced edge guides to keep said web on said web transport element.

2. The improvement of claim 1 wherein said bristles are laterally flexible to allow a web to be loaded or unloaded relative to said web transport element without damage to said web or said bristles, and wherein said bristles are relatively longitudinally stiff to keep said web on said web transport element.

3. The improvement of claim 1 wherein said bristles are electrically conductive to reduce static buildup on said web as it is transported relative to said web transport element.

4. In magnetic tape recording and/or reproducing apparatus, the improvement comprising:
    a tape transport element having a core supporting magnetic tape and spaced tape edge guides; and
    a tape keeper including a fixed support and a plurality of bristles permanently extending from said support between said spaced tape edge guides to keep said magnetic tape on said tape transport element, wherein only said tape keeper bristles extend between said spaced tape edge guides.

5. The improvement of claim 4 wherein said bristles are electrically conductive to reduce static buildup on said magnetic tape as it is transported relative to said tape transport element.

6. The improvement of claim 4 wherein said bristles are laterally flexible to allow said magnetic tape to be loaded and unloaded relative to sago tape transport element without damage to said magnetic tape or said bristles and wherein said bristles are longitudinally relatively stiff to keep said magnetic tape on said tape transport element.

* * * * *